United States Patent [19]

Smith

[11] Patent Number: 4,893,692

[45] Date of Patent: Jan. 16, 1990

[54] SNOWMOBILE

[75] Inventor: Morley L. Smith, Beaconsfield, Canada

[73] Assignee: GSM Design, Saint-Laurent, Canada

[21] Appl. No.: 231,339

[22] Filed: Aug. 11, 1988

[51] Int. Cl.⁴ ............................................. B62D 25/16
[52] U.S. Cl. ................................................... 180/190
[58] Field of Search ............. 280/21 A; 180/190, 182, 180/186; 114/283; 244/101, 105, 106, 108

[56] References Cited

U.S. PATENT DOCUMENTS

| | | | |
|---|---|---|---|
| 2,196,946 | 4/1940 | Stone | 244/101 |
| 3,521,595 | 7/1970 | Mix | 180/190 X |
| 4,140,076 | 2/1979 | Borglum | 114/283 |
| 4,418,782 | 12/1983 | Nakazima | 180/190 |

Primary Examiner—Charles A. Marmor
Assistant Examiner—Michael Mar
Attorney, Agent, or Firm—Diller, Ramik & Wight

[57] ABSTRACT

A floatable snowmobile make up of a one-piece molded plastics body comprising an engine compartment with a recess defined therein for receiving an engine and accessories; an elongated seat-bench provided with a recess for receiving a track assembly; and a cargo support extending rearwardly thereof. The molded body includes a rigid skin forming the shell defining an enclosed cavity in which there is provided an expanded closed-cell foam core of water-buoyant material. The skis are constructed as pontoons of similar construction to the body, and the whole snowmobile can float with a portion thereof out of the water so as to support a rider clear of the water in the event the snowmobile falls through ice.

8 Claims, 2 Drawing Sheets

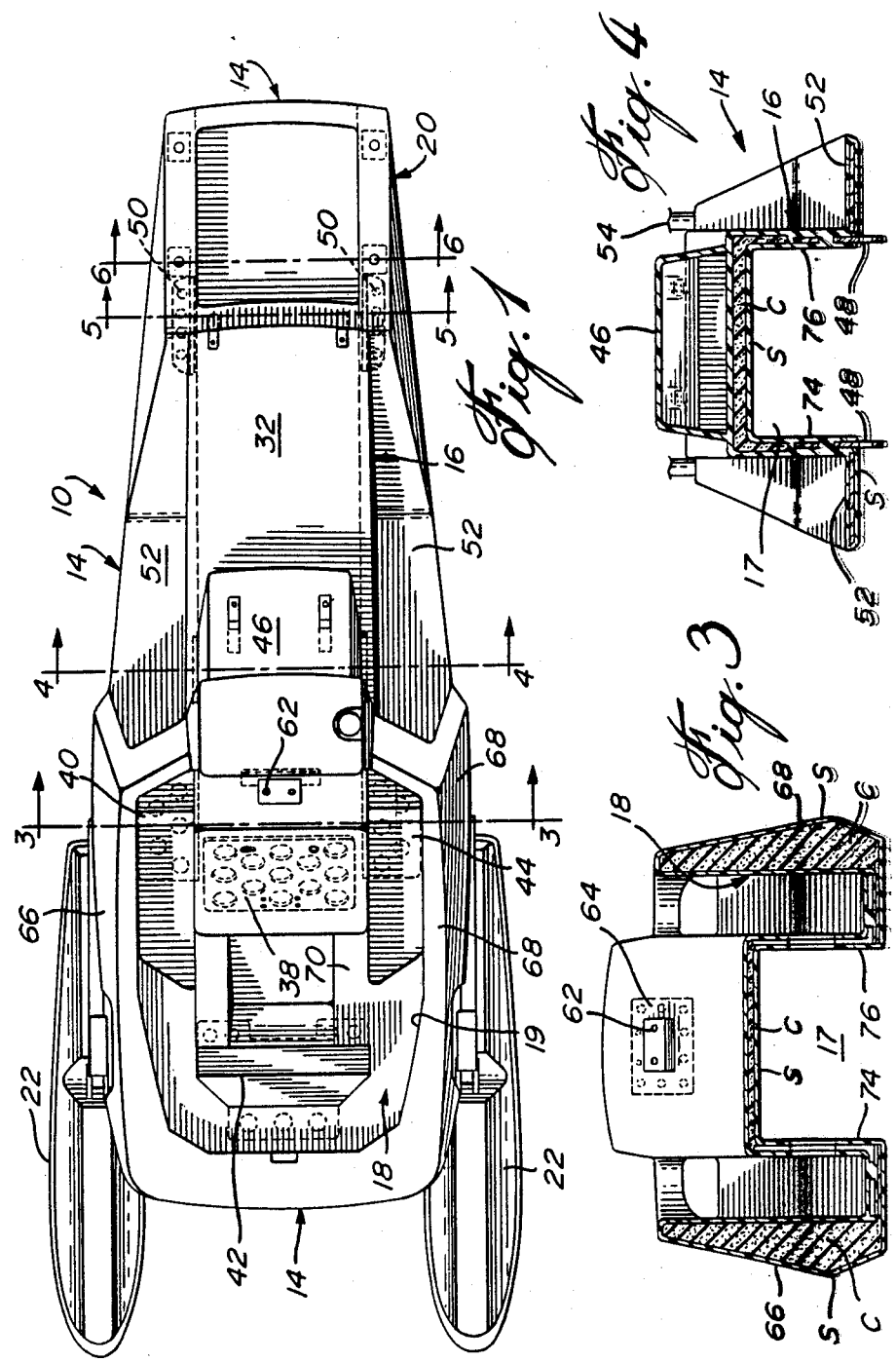

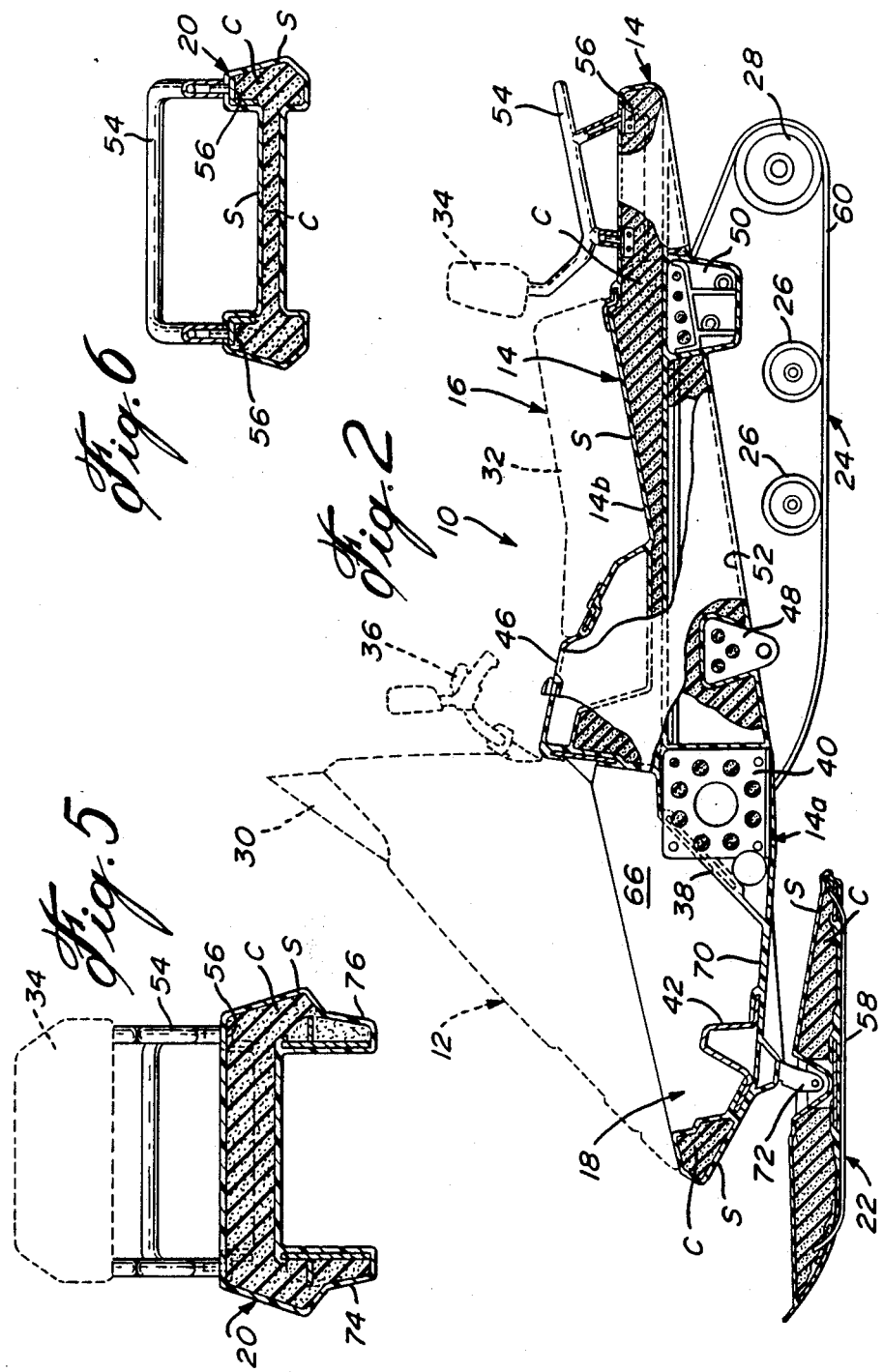

SNOWMOBILE

BACKGROUND OF THE INVENTION

1. Field of the Invention

The present invention relates to snowmobiles, and more particularly, to a personal snowmobile capable of floating.

2. Description of the Prior Art

Snowmobiles of the type popularized by Joseph Armand Bombardier in the early 1960s have become a necessary transport vehicle in the high north. Eskimos and other Arctic residents utilize snowmobiles for hunting, trapping, and other life-supporting activities.

The northern Canadian Arctic, however, consists of islands separated by expanses of the Arctic Ocean mostly frozen in winter. The hunter or trapper must often travel on ice. In the case of the Arctic Ocean, the ice is always in movement depending on the direction of the wind, currents, etc. This ice movement often creates open water, or thin ice surfaces Such moving ice is treacherous, and snowmobile riders can break through with their vehicles into the near freezing water. A human being can die in a matter of minutes in such freezing water.

Snowmobiles of a conventional construction, that is, having an aluminum frame, have been provided with flotation inserts, but such vehicles will float almost fully submerged, particularly when supporting the weight of a rider. In such conditions, the rider may be in water literally up to his neck. The rider might not drown, but could die of exposure unless he is immediately pulled from the water.

SUMMARY OF THE INVENTION

It is an aim of the present invention to provide an improved snowmobile capable of floating on water and supporting a rider out of the water.

It is also an aim of the present invention to provide an improved snowmobile construction including a molded body free of structural stresses inherent in structures normally fabricated with metal parts.

A construction in accordance with the present invention comprises a snowmobile having an elongated one-piece molded plastics body having flotation sections, and means for mounting accessories to the one-piece molded body.

In a more specific embodiment of the present invention, the one-piece body comprises a molded shell of rigid plastics material filled with an expanded closed cellular floatable material providing flotation to the snowmobile sufficient so that at least a top portion thereof is above water with the weight of a rider when the snowmobile is floating on water.

In a more specific embodiment of the present invention, the molded body includes a shell formed by a rigid plastic skin in which a lighter-than-water material of closed cellular foam has been expanded therein, and chain plates are provided on the inside of the shell skin to which accessories may be attached from the exterior of the shell.

In a more specific embodiment of the present invention, there is provided an elongated one-piece body for a snowmobile comprising a closed shell including a rigid skin defining a hollow cavity in which a foam is expanded therewithin, the shell having the overall shape of the snowmobile housing including an engine compartment with a recess defined in the front part of the body. An elongated rider support portion extends rearwardly of the engine compartment and terminates in a rear baggage support section. The rider support section defines a track run recess in the bottom thereof. Chain plates are provided within the cavity at strategic locations, against the skin forming the shell. The chain plates are provided at least about the recess in the engine compartment and the recess in the rider support section forming the track run.

The portions of the shell in the area of the engine compartment surrounding the engine recess and in the area of the cargo support section are formed with enlarged volume sections to thereby provide increased flotation portions. A fuel reservoir may be formed as a molded hollow shell segment between the engine compartment and the rider support section.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a top plan view of a snowmobile in accordance with the present invention;

FIG. 2 is a side elevation, partly in cross-section and partly in dotted lines;

FIG. 3 is a vertical cross-section, taken along line 3—3 of FIG. 1;

FIG. 4 is a vertical cross-section, taken along line 4—4 of FIG. 1;

FIG. 5 is a vertical cross-section, taken along line 5—5 of FIG. 1; and

FIG. 6 is a vertical cross-section, taken along line 6—6 of FIG. 1.

DESCRIPTION OF THE PREFERRED EMBODIMENTS

Referring to the drawings, there is shown a snowmobile 10 made up of a molded elongated body 14 having a cab 12 over an engine compartment 18 and an elongated seat-bench 16. The seat-bench 16 extends to merge with a cargo support section 20. The engine compartment 18, the seat-bench 16, and the cargo section 20 are all made of a molded one-piece body member.

The one-piece molded body member 14 includes an outer skin molded in two or three shell parts, assembled together and then filled with a closed-cell foam material. In a preferred embodiment, the skin S is made of a glass reinforced polyester laminate. The skin S could also be a molded glass fiber epoxy laminate shell or other molded material.

The foam material which is expanded within the hollow shell is, in one embodiment, made of a closed-cell structural urethane.

The one-piece body so formed replaces the frame, usually of aluminum, and paneling, usually of glass fiber, provided for a snowmobile, on which a canopy in the form of a cab is provided. Other paneling is mounted on the frame for filling out the vehicle. In the present construction, it is the molded body 14 which forms the engine compartment 18, the seat-bench 16, and the cargo support section 20. A cab or hood 12 may be placed on the front of the body 14 over a recess 19 forming the engine compartment 18.

The recess 19 of the engine compartment 18 includes a floor 70 with side walls 66 and 68. The side walls 66 and 68 are portions of the body 14 having skin S and foam core C which is expanded therewithin.

FIG. 3 shows the widest part of the engine compartment section 18 of the body 14. The engine compartment 18 is also provided with mounting brackets for mounting the various components, such as the engine proper (not shown), the muffler, and the variable speed transmission.

The brackets may be chain plates attached to the inner surface of the shell or skin S, such as chain plate 38, seen in FIGS. 1 and 2. The chain plate 38 may have a number of openings to allow the plastics material forming the skin S to pass therethrough during the molding process. Glass fiber strips or other material reinforcing strips can be placed over the chain plate on the inner surface of the skin S to fasten the chain plate. The chain plates allow accessories to be attached to the skin S from the outer surface of the body 14 as at 38.

A modified chain plate is shown at 42 including a bracket which projects out from the wall 70 of the recess 19. As shown in FIG. 2, the bracket 42 protrudes upwardly in the engine compartment 18 and allows the engine to be mounted thereon. Other accessories, such as the muffler and variable speed transmission, not shown, can be mounted in recess 19, near side walls 66 and 68 respectively, to chain plates 40 and 44.

As shown in FIG. 3, a steering rod bracket 62 may be mounted on an exposed wall within the engine compartment 18, and this bracket 62 includes a chain plate 64 mounted to the inner surface of the skin S with the bracket 62 protruding through to the outer surface.

The seat-bench portion 16 of the molded body 14 includes an elongated recess 17 to accommodate a conventional track assembly 24 mounted under the seat-bench 16. The recess 17 includes side walls 74 and 76 formed by the molded body 16 including the skin S and the foam core C. Chain plates 48 and 50 are mounted in the side walls 74 and 76 in order to mount the track assembly 24. The track proper is, of course, driven over the idlers 26 and the sprocket 28 by the variable transmission (not shown).

A conventional molded foam seat 32 and a molded gas tank shell 46 can be fitted to the front of the seat-bench 16, as shown in FIG. 2. Other accessories, such as a steering column and steering handle 36, can be mounted to the molded body 14 by means of bracket 62. Foot boards 52 are provided on either side of the seat-bench 16 and are integral with the one-piece molded body 14.

A cargo rack 54 is mounted on the cargo support section 20 of the molded body 14, as shown in FIG. 2. The cargo rack 54 may include a back rest 34, and anchor plates 56 are mounted to the molded body 14 in a similar manner as the chain plates. The rack 54 is mounted to the anchor plates 56.

A pair of skis 22 may be provided under the engine compartment 18, and in the present embodiment, are made like pontoons having a similar construction as the molded body 14. In other words, each ski 22 includes a pair of plastic shells attached together, and a foam core C is expanded in the cavity so formed. The foam core is similar to that used in the one-piece molded body 14.

The snowmobile 10 is constructed by first molding the lower shell 14a, and upper shell units 14b are attached thereto. These shells form the skin S in the assembled body 14. Prior to assembling the shells to form the body, chain plates 38, 40, 42, etc., are adhered to the inner surface of the shells against the skin S while the shell is being molded. In order to ensure a secure attachment of the chain plates to the skin S, strips of glass fiber material or other material is patched over the chain plates to the inner surface of the skin S. The foam core C is expanded within the cavity formed by the shells 14a and 14b.

The foam material C is lighter than water, i.e., has a high buoyancy, and this allows the snowmobile, even with the metal accessories, such as the engine, etc., to float high in the water. Various parts of the body are strategically increased in volume in order to provide greater buoyancy evenly along the length of the vehicle. For instance, as shown in FIGS. 3 and 5, the side walls 74 and 76 have been designed with an increased girth in order to allow for a larger volume of foam core therein, thereby providing more buoyancy.

Once the body 14 has been formed with the chain plates already integral with the body, the various accessories, such as an engine, track assembly 24, support rack 54, steering column and steering handles 36, can be mounted to the one-piece body by attaching these accessories through the skin S to the chain plates.

The skis 22 are thus mounted to pivot brackets 72 to provide buoyancy to the vehicle, particularly in the area of the engine compartment 18.

I claim:

1. A floatable snowmobile comprising an elongated one-piece molded polymeric/copolymeric synthetic plastics body; a pair of skis, means for supporting said skis relative to said body; said body including a front engine compartment portion, an elongated bench-seat portion, and a cargo support portion; the engine compartment portion of the body defining a recess for receiving an engine and accessories; at least the bench-seat portion defining a track run recess in the bottom thereof for accommodating a track assembly; said body being defined by a generally hollow shell; said hollow shell setting-off hollow front, medial and rear hollow compartment portions; a pair of side walls on each side of said body; each pair of side walls defining an upstanding hollow side wall compartment portion; said hollow side wall compartment portions being on opposite sides of a floor of said front engine compartment portion; and high buoyancy polymeric/copolymeric synthetic cellular foamed in situ plastics generally filling said hollow compartment portions and said hollow side wall compartment portions.

2. A flotatable snowmobile as defined in claim 1 including means for mounting accessories to said body in the form of chain plates provided in the shell mounted on the inner surface thereof and placed strategically for mounting accessories to the body.

3. A floatable snowmobile as defined in claim 1, wherein chain plates are mounted about the engine compartment recess, and further chain plates are mounted about the track run recess for respectively mounting the engine and accessories and the snowmobile track assembly.

4. A floatable snowmobile as defined in claim 1, wherein a cab hood is provided over the engine compartment recess in the molded plastics body.

5. A floatable snowmobile as defined in claim 1, wherein each skis is filled with high buoyancy polymeric/copolymeric synthetic cellular foam in situ plastics.

6. A floatable snowmobile as defined in claim 1, wherein each ski includes a rigid plastics skin defining a hollow cavity housing said cellular foamed plastics.

7. A floatable snowmobile as defined in claim 1, wherein the portions of the hollow shell forming the molded body have increased volume sections in the area of the engine compartment and in the area of the cargo support section.

8. The floatable snowmobile as defined in claim 1, including runners along the bottom of said skis to reduce the wear of the hollow shells thereof.

* * * * *